(12) United States Patent
Eckroad

(10) Patent No.: US 7,518,266 B2
(45) Date of Patent: Apr. 14, 2009

(54) METHOD AND APPARATUS FOR IMPROVING AC TRANSMISSION SYSTEM DISPATCHABILITY, SYSTEM STABILITY, AND POWER FLOW CONTROLLABILITY USING DC TRANSMISSION SYSTEMS

(75) Inventor: Steven Wallace Eckroad, Charlotte, NC (US)

(73) Assignee: Electric Power Research Institute, Inc., Charlotte, NC (US)

( * ) Notice: Subject to any disclaimer, the term of this patent is extended or adjusted under 35 U.S.C. 154(b) by 114 days.

(21) Appl. No.: 11/555,430

(22) Filed: Nov. 1, 2006

(65) Prior Publication Data

US 2008/0103630 A1    May 1, 2008

(51) Int. Cl.
*H02J 3/38* (2006.01)
*H02J 3/00* (2006.01)
*H02J 1/00* (2006.01)
*G05D 9/00* (2006.01)

(52) U.S. Cl. .................. 307/82; 307/19; 700/286
(58) Field of Classification Search ............... 307/18, 307/82, 19; 700/286
See application file for complete search history.

(56) References Cited

U.S. PATENT DOCUMENTS

| 4,019,115 | A | * | 4/1977 | Lips ............................ 363/65 |
| 4,419,591 | A | * | 12/1983 | Irokawa et al. ................ 307/45 |
| 6,184,593 | B1 | * | 2/2001 | Jungreis ....................... 307/64 |
| 2002/0060497 | A1 | * | 5/2002 | Arita et al. ..................... 307/42 |
| 2004/0135436 | A1 | * | 7/2004 | Gilbreth et al. ............... 307/18 |
| 2007/0273211 | A1 | * | 11/2007 | Wang et al. ................... 307/45 |

* cited by examiner

*Primary Examiner*—Albert W Paladini
*Assistant Examiner*—Michael Rutland Wallis
(74) *Attorney, Agent, or Firm*—Tergo, Hines & Ladenheim, PLLC

(57) ABSTRACT

An electric power transmission system that isolates a local AC transmission network from a surrounding AC system includes a local AC load center having a plurality of local AC loads, and a distribution feeder serving the plurality of local AC loads and at least one distant electric power generating station or other power source for supplying AC power to the local AC load center. A complete or partial DC transmission ring is interposed between the local AC load center and the distant electric power generating station for isolating the AC power received from the distant electric power generating station from the local AC load center by converting the AC power to DC power. The DC power is re-converted into AC power based on load requirements and the distribution feeder supplies the AC power while all local AC loads are isolated from the distant electric power generating station.

21 Claims, 3 Drawing Sheets

METHOD AND APPARATUS FOR IMPROVING AC TRANSMISSION SYSTEM DISPATCHABILITY, SYSTEM STABILITY, AND POWER FLOW CONTROLLABILITY USING DC TRANSMISSION SYSTEMS

TECHNICAL FIELD AND BACKGROUND OF THE INVENTION

This invention relates to a method and apparatus for improving AC transmission system dispatchability, system stability, and power flow controllability using DC transmission systems. Consolidated load centers (e.g., large urban areas or geographical areas with significant contiguous load) are typically served through a local AC network by a combination of local generation (i.e., inside or immediately adjacent to the load center) and long distance, high-voltage AC or DC transmission lines from distant generation sources. Often, the area is enclosed or partially enclosed by a high voltage AC ring. In some cases, power destined for other, distant load centers is fed, or "wheeled" through the local AC network. This is illustrated schematically in FIG. 1. This arrangement is vulnerable to voltage stability and service interruptions due to outage or fault events on one or more of the long distance lines serving the area, which subsequently cascade into the local area. Additionally, it is difficult to control the loading of either the long distance lines or the local network. Typically this would require the addition of expensive AC controllers such as the Unified Power Flow Controller (UPFC) or other flexible AC transmission systems (FACTS) devices. The regional grid or local load center in this situation is not isolated and not controllable.

A partial solution would be to serve the regional network or load center entirely by small, distributed generation units located near the loads, and connected to the network and controlled in a unified fashion, such as via an AC ring, as illustrated in FIG. 2. Generators would be dispatched as needed to serve nearby load and could be ramped up and down throughout the load cycle. There would be less vulnerability to events on distant transmission lines. However, such a solution has many difficulties, including the cost of small generators and the difficulty siting them in populated areas. Moreover, this solution does not provide for the wheeling of bulk power through the area.

SUMMARY OF THE INVENTION

Therefore, it is an object of the invention to provide a hierarchically controlled DC transmission ring, or partial ring, serving a regional network or local load center, such as a large city, utilizing controllable AC-DC converters in a multi-in-feed/out-feed arrangement. This provides a very stable AC-DC-AC power delivery network that provides fully controllable power to all of the fed loads, while simultaneously controlling the power flow on all incoming and outgoing AC and/or DC lines.

In accordance with one embodiment of the invention, a DC electric power transmission system isolates a local AC transmission network from a surrounding AC system. A local AC load center is provided, having a plurality of local AC loads, and one or more distribution feeders serving the plurality of local AC loads. A distant AC load may be provided. At least one distant electric power generating station supplies AC power to the local AC load center and/or the distant AC load via an AC transmission line, and a DC transmission ring or partial ring having a plurality of DC loads thereon is at least partially interposed between the local AC load center and the distant electric power generating station and the distant load. The DC transmission ring isolates the AC power received from the distant electric power generating station from the local AC load center. A first plurality of AC/DC converters are electrically interfaced with the DC transmission ring exterior to the local AC load center for converting the AC power from the distant generating station into DC power that flows on the DC transmission ring, and making this DC power to at least some of the other of the plurality of DC loads on the DC transmission ring. A second plurality of AC/DC converters are electrically interfaced with the DC transmission ring for converting the DC power from the DC transmission ring into AC power that is routed either to local AC loads or distant loads. The one or more distribution feeders within the local AC load center are electrically connected to the DC transmission ring through the second plurality of AC/DC converters for supplying the AC power to the local AC load center while all local AC loads are isolated from the distant electric power generating station. A transmission line external to the local AC load center is electrically connected to the DC transmission ring through the second plurality of AC/DC converters for supplying AC power to distant loads while all local AC loads are isolated from this power transfer operation.

According to another embodiment of the invention, a plurality of isolating DC-DC converters is interposed at predetermined locations on the DC transmission ring for isolating faults on the DC transmission ring to prevent the faults from disturbing the system or causing complete system collapse.

According to another embodiment of the invention, at least one local AC power generator is electrically connected to the AC load center via the DC transmission ring.

According to another embodiment of the invention, the AC power generated by the distant electric power generating station is transmitted to the local network by means of a transmission line that is selected from the group of transmission lines consisting of high voltage (HV) or extra high voltage (EHV), and may be overhead or underground.

According to another embodiment of the invention, controlled AC/DC converters direct power scheduled to flow from the distant electric power generating station to a market distant to the local AC load center across the DC transmission ring.

According to another embodiment of the invention, the system includes at least one DC power source located within the local AC load center in electrical communication with the DC transmission ring. The DC transmission ring isolates the DC power sources from the AC loads and provides for controlled dispatch of the DC sources.

According to another embodiment of the invention, a plurality of diverse distributed generation DC power sources are located within the local AC load center in electrical communication with the DC transmission ring. The DC transmission ring isolates the DC power sources from the AC loads and provides for controlled dispatch of the DC sources.

According to another embodiment of the invention, the AC-DC converters are voltage source converters.

According to another embodiment of the invention, a plurality of diverse distributed generation DC power sources are located within the local AC load center in electrical communication with the DC transmission ring and are selected from the group consisting of fuel cells, microturbines, solar photovoltaic devices, batteries and DC microgrids. The DC transmission ring isolates the DC power sources from the AC loads and provides for controlled dispatch of the DC sources.

According to another embodiment of the invention, a second DC transmission ring is interconnected with the system and following a similar but not contiguous route for back-up use.

According to another embodiment of the invention, a DC electric power transmission system is provided that isolates a local AC transmission network from a surrounding AC system, and includes a local AC load center having a plurality of AC loads, an AC distribution feeder serving the plurality of AC loads, and a local DC load center having a plurality of DC loads, and a DC distribution feeder serving the plurality of DC loads. At least one distant electric power generating station supplies AC power to the local AC load center. A DC transmission ring having a plurality of DC loads thereon is at least partially interposed between the local AC and DC load centers and the distant electric power generating station. The DC transmission ring isolates the AC power received from the distant electric power generating station from the local AC and DC load centers. A first plurality of AC/DC converters is electrically interfaced with the DC transmission ring exterior to the local AC load center for converting the AC power from the generating station into DC power and making available the DC power converted at one of the AC/DC converters to at least some of the other of the plurality of DC loads on the DC transmission ring. A second plurality of AC/DC converters is electrically interfaced with the DC transmission ring within the AC local load center for converting the DC power from the DC transmission ring into AC power for delivery to the AC loads. The AC distribution feeder within the local AC load center is electrically connected to the DC transmission ring through the second plurality of AC/DC converters for supplying the AC power to the local AC load center while all local loads are isolated from the distant electric power generating station. The DC distribution feeder within the local DC load center is electrically connected to the DC transmission ring through the second plurality of AC/DC converters for supplying the DC power to the DC transmission ring.

According to another embodiment of the invention, a plurality of diverse distributed generation DC power sources are located within the local AC transmission network in electrical communication with the DC transmission ring. The DC transmission ring isolates the DC power sources from the AC loads and provides for controlled dispatch of the DC sources.

A method of isolating a local AC transmission network from a surrounding AC system according to an embodiment of the invention, includes a system having an AC load center with a plurality of AC loads, one or more distribution feeders serving the plurality of local AC loads and at least one distant electric power generating station for supplying AC power to the local AC load center. The method includes the steps of at least partially interposing a DC transmission ring having a plurality of DC loads thereon between the local AC load center and the distant electric power generating station, and isolating the AC power received from the distant electric power generating station by the DC transmission ring from the local AC load center. The AC power from the generating station is converted into DC power and made available to at least some of the other of the plurality of DC loads on the DC transmission ring.

The DC power from the DC transmission ring is converted into AC power; and the AC power is distributed within the local AC load center while all local AC loads are isolated from the distant electric power generating station.

According to another embodiment of the invention, the method includes the step of interposing at predetermined locations on the DC transmission ring a plurality of isolating DC-DC converters for isolating faults on the DC transmission ring to prevent the faults from disturbing the system.

According to another embodiment of the invention, the method includes the step of electrically connecting at least one local AC power generator to the AC load center within the DC transmission ring.

According to another embodiment of the invention, the method includes the step of directing power scheduled to flow from the distant electric power generating station to a market distant to the local AC load center across the DC transmission ring.

According to another embodiment of the invention, the method includes the step of providing at least one DC power source located on the local AC transmission network in electrical communication with the DC transmission ring.

According to another embodiment of the invention, the method includes the step of providing a plurality of diverse distributed generation DC power sources located within the local AC transmission network in electrical communication with the DC transmission ring.

According to another embodiment of the invention, the method includes the step of providing a plurality of diverse distributed generation DC power sources located within the local AC transmission network in electrical communication with the DC transmission ring and selected from the group consisting of fuel cells, microturbines, solar photovoltaic devices, batteries and DC microgrids.

According to another embodiment of the invention, the method includes the step of providing a second DC transmission ring interconnected with the system and following a similar but not contiguous route for back-up use.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED
EMBODIMENTS AND BEST MODE

Figure 1:
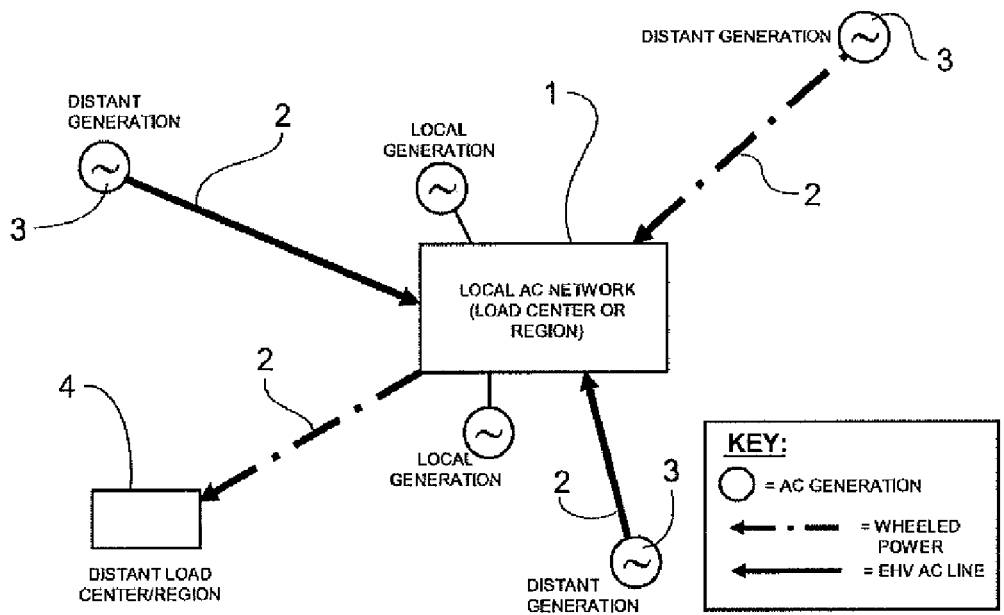
FIG. 1 is a schematic view of a typical AC network.

As referenced above, FIG. 1 depicts a typical AC network that includes a local AC load center or region, 1, fed or traversed by several high voltage (HV) or extra-high voltage (EHV) AC transmission lines, 2. Distant generation stations 3 (e.g., nuclear or coal-fired), generate electricity that is either consumed in the local AC load center or wheeled through the local AC load center to more distant markets 4. Nearby or "local" generating stations 5 also provide electricity to local and/or distant markets. Power flow in this local and extended AC network is regulated by Ohm's Law—that is, it is not actively controlled. Power flows to the path of least resistance, potentially leading to under-utilized and/or overloaded transmission and distribution assets. Faults on the HV or EHV feeders may cascade into the local AC transmission network leading to outages. Voltage instabilities or collapse may occur in the local AC transmission network due to unregulated flow through the network from distant generation to distant loads.

Figure 2:
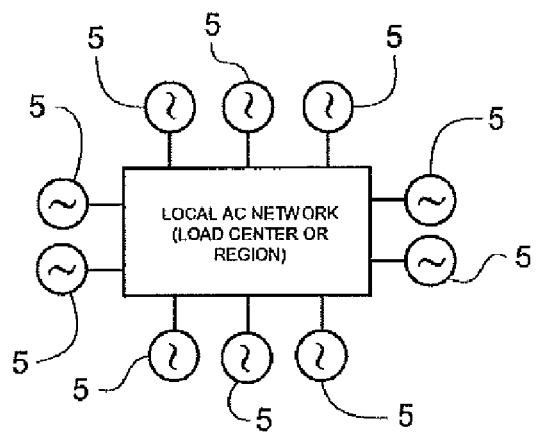
FIG. 2 is a schematic view of a partial solution to the problem of controlling load flows within and through an AC network.

FIG. 2 shows a partial solution to the problem of controlling load flows within and through the AC network 1. In this case the regional network or load center is served entirely by small, distributed AC generators 5 near the loads, and connected to the local network and controlled in a unified fashion, such as via an AC ring (not shown). The local generators 5 are dispatched as needed to serve nearby loads and can be ramped up and down throughout the load cycle. There is no significant connection to an external AC grid, thus no problems with scheduled or unscheduled power flowing through the local AC transmission network.

Figure 3:
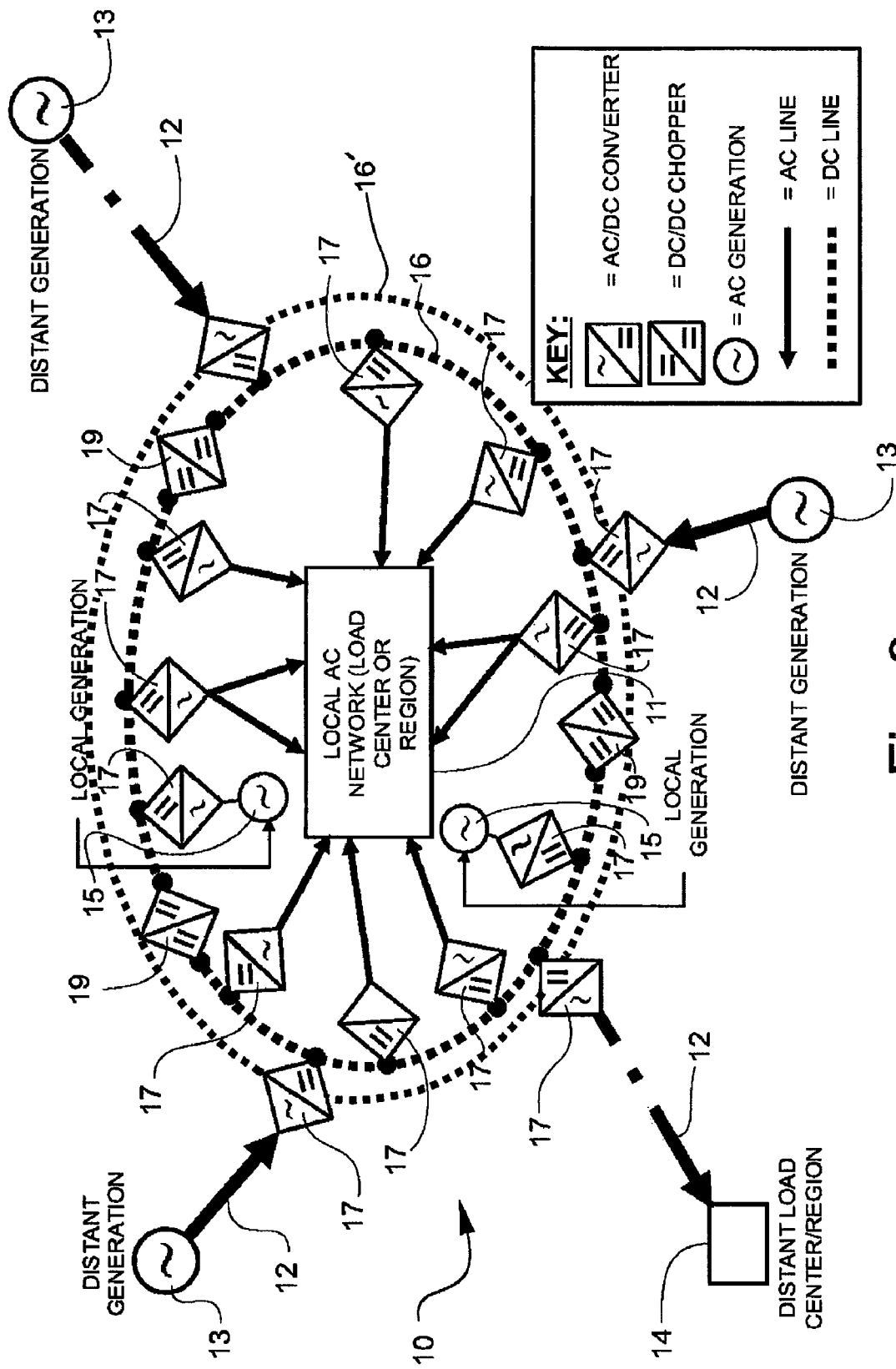
FIG. 3 is a schematic view of a system according to an embodiment of the invention, illustrating how the system isolates the local AC transmission network from the rest of the surrounding AC system by interposing a DC transmission ring between the local AC transmission network (loads and generators) and the external AC grid.

Referring now to FIG. 3, a preferred embodiment of the invention illustrates a system 10 that completely isolates a local AC transmission network from the rest of a surrounding AC system by interposing a DC transmission ring between the local AC transmission network (AC loads and generators) and the external AC grid. The system 10 includes a local AC load center or region 11, whose loads are served primarily via several high voltage (HV) or extra-high voltage (EHV) AC transmission lines, 12. Distant generation stations 13 generate electricity that is either consumed in the local AC load center 11 or in more distant markets 14. Nearby, or "local" generating stations 15 also provide electricity to local and/or distant markets 14. In contrast to other systems, however, all supplying generation, whether local or distant, is not connected directly to the loads, but must reach those loads via a high power DC transmission ring, 16. The DC ring 16 partially or fully "encloses" the targeted load region 11, which may be a large city or load center, or a large geographical area comprising significant customer load but also subject to uncontrolled power flows.

Each AC HV or EHV line 12 passing into the local area is connected to the DC ring 16 via an AC/DC converter 17, which converts the AC power to DC power and makes that power available to every other DC load, or "client", on the DC ring 16. A preferred type of AC/DC converter is a voltage source converter (VSC) because of the ease of controlling power flowing through it. Every AC subtransmission or distribution feeder serving loads within the local AC transmission network 11 is connected to the DC ring 16 via the AC/DC converter 17, which converts the DC power back to AC power. In this manner, all local AC loads are completely isolated from the external AC system.

Moreover, power that is scheduled to flow from distant generation stations 13 to distant markets 14 must first traverse the DC ring 16, via a controlled VSC 17. This allows full control of all supplies and all loads within the system 11 in accordance with minute-by-minute need. This prevents over or under-utilized lines and every load is immune to events on all lines except the one feeding it. Faults on the DC ring 16 are kept from disturbing the entire system by means of isolating DC-DC converters, or "choppers" 19, interposed at various places around the ring 16. If a fault occurs somewhere along the DC ring 16, the DC-DC converters 19 are used to sectionalize the DC ring 16 and isolate the faulted portion. The DC-DC converters 19 may also be used to actively control power flow on the ring 16, if deemed beneficial.

Figure 4:
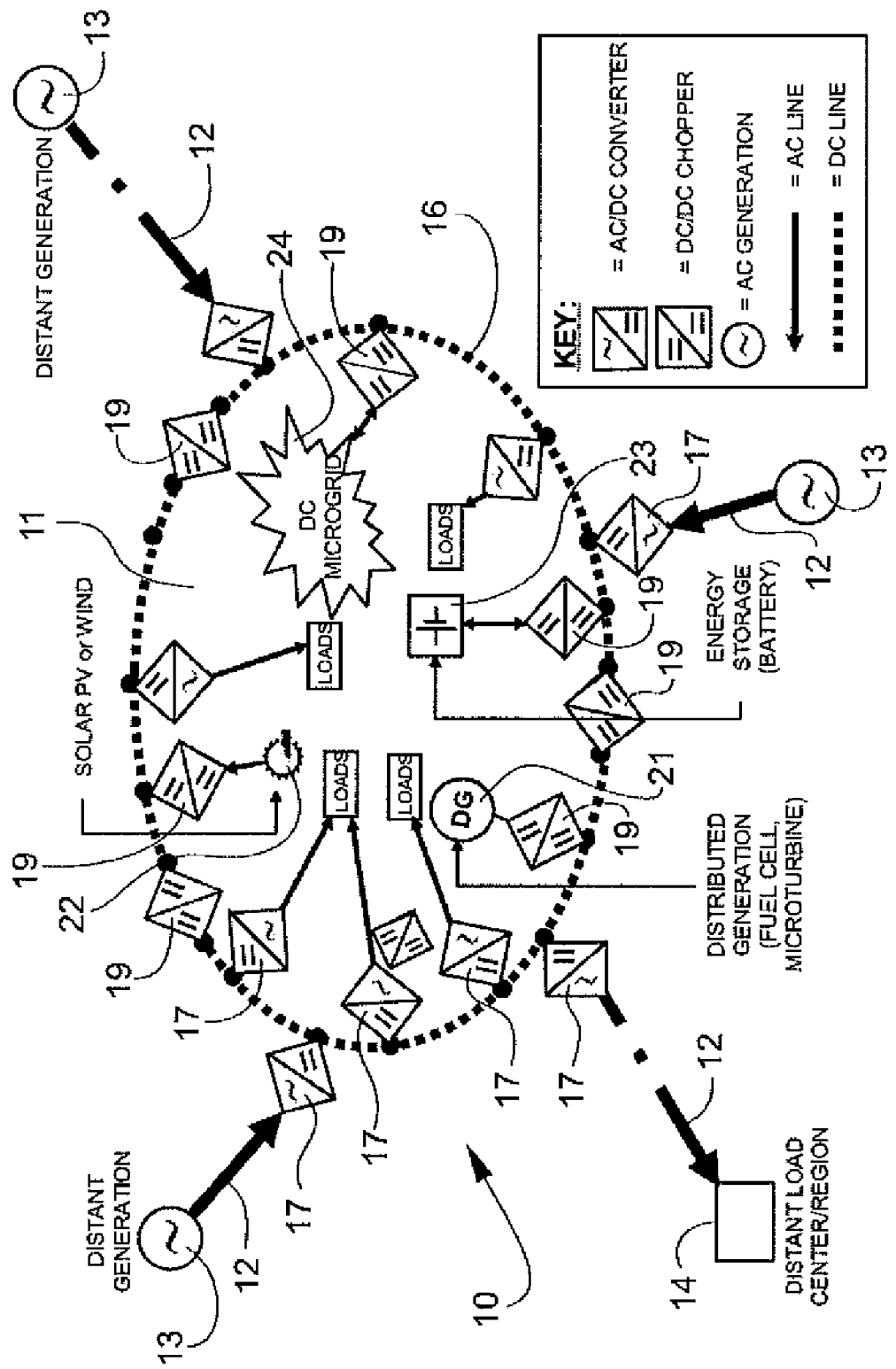
FIG. 4 is a schematic view illustrating how a system according to an embodiment of the invention provides for integration of other types of local generation and loads.

Referring now to FIG. 4, a more detailed view of the DC transmission system 10 illustrates that the system 10 provides for easy integration of other types of local generation and loads, such as distributed generation (DG)—e.g., fuel cells and microturbines 21; distributed renewable energy sources—e.g., solar photovoltaic devices 22; energy storage devices—e.g., batteries 23; and DC microgrids 24. Many of these technologies produce DC power as their native output. When connected to an AC system, these technologies must incorporate conversion from DC to AC. These additional resources are preferably connected directly to the DC transmission ring 16. This allows dispatching these resources as needed and as available without concomitant instabilities or negative interactions with the grid that are normally associated with these sources.

More specifically, the proposed system replaces or augments the conventional high-voltage AC network that serves a regional network or local load center 11, such as a large city. The DC transmission ring 16, or partial ring, "brokers" all power exchanges to and from the region 11 utilizing hierarchically controlled AC-DC converters 17 in a multi-in-feed/out-feed arrangement. This arrangement results in an extremely stable network that is fully controllable for internal and external, planned and unplanned changes in load and/or supply. Power flow control through the region 11 is fully dispatchable with respect to which AC lines are dispatched, and at what power level.

The invention "simulates" the distribution of mutually controlled, small distributed AC generators envisioned in FIG. 2, while allowing bulk power wheeling through the area and without the siting, fuel supply, and other environmental issues associated with AC generators. The invention further creates an asynchronous AC zone that is fully isolated and protected from the surrounding AC network, and which can be simply modeled in power flow or stability analysis programs. Multiple zones across a wide geographical area are possible, with inter-zone connectivity being supplied by any of a variety of bulk power transmission systems known to the art (e.g., EHV AC, HVDC, etc.).

The invention also allows for and even promotes the simplified use of advanced distributed generation (DG) resources such as fuel cells and solar photovoltaics (PV), or distributed energy storage units such as batteries or flywheels. Since most of these distributed technologies output DC rather than AC power, their connection to the local loads and control are more easily achieved via the DC ring 16. Similarly, DC microgrids 24 are readily integrated into the local AC system through connection with the DC transmission system in the invention.

A second, identical DC transmission ring 16' for contingency purposes and to improve reliability, following a similar but not contiguous route, is optional. Standard control system hardware and software, with hierarchical programming is utilized.

The DC line or cable forming the ring 16 may be conventional, high ampacity, HVDC overhead conductors, underground DC cable, or high ampacity, low-voltage DC superconducting cable. For system security, underground cable is be preferred. For high power loads and large rings (long cable runs), DC superconducting cable would be ideal.

The AC-DC converters 17 may be voltage source converters (VSCs), but other topologies having similar functions are possible. System control is hierarchical using methods known in the art. The hierarchical control system provides for overall master control of the system, controlling all in-feeds, load service, and wheeling power needs. In one preferred embodiment, the control may be from a central energy dispatch center to admit and control power as needed from long distance AC lines; or to dispatch controlled power to loads within the load center as needed; or to manage the flow of power into and out of the load center when power is to be wheeled across the area. In another preferred embodiment, one converter station would be the lead and all the others would follow. In this case the lead converter station would establish the operating DC voltage and the other converter stations would operate in a current controlling mode. Standard communications systems are utilized among the multiple converter stations. Controllers for each AC/DC converter 17 are fitted with a local control system and filters such that they do not adversely interact with each other and respond only to signals from the hierarchical control system, such as a dispatch center or lead converter station.

A method and apparatus for improving AC transmission system dispatchability, system reliability and power flow controllability using DC transmission systems is described above. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

I claim:

1. An electric power transmission system, comprising:
   (a) a group of individual utility customers interconnected by a local AC transmission network within a defined geographical area;
   (b) a DC transmission ring substantially surrounding the local AC transmission network, the DC transmission ring isolating the local AC transmission network from an AC generating station;
   (c) a first AC/DC converter electrically connected between the DC transmission ring and the AC generating station to receive and convert AC power from the AC generating station to DC power for distribution along the DC transmission ring;
   (d) a second AC/DC converter electrically connected between the DC transmission ring and the local AC transmission network, the second AC/DC converter adapted to receive and convert DC power from the DC transmission ring to AC power for distribution to the AC transmission network; and
   (e) a plurality of isolating DC-DC converters interposed at predetermined locations on the DC transmission ring for isolating faults on the DC transmission ring to prevent the faults from disturbing the system.

2. The electric power transmission system according to claim 1, wherein the DC transmission ring is a cable selected from the group consisting of HVDC overhead conductors, underground DC cable, and low voltage DC superconducting cable.

3. The electric power transmission system according to claim 1, wherein the AC generating station is a local AC power generator electrically connected to the DC transmission ring.

4. The electric power transmission system according to claim 1, wherein the AC power generated by the AC generating station is distributed to the DC transmission ring via an AC transmission line that is selected from the group consisting of high voltage (HV), extra high voltage (EHV), high voltage DC (HVDC) and DC transmission cable.

5. The electric power transmission system according to claim 1, further including controlled AC/DC converters for directing power scheduled to flow from a distant electric power generating station to a market distant to the local AC transmission network across the DC transmission ring.

6. The electric power transmission system according to claim 1, further including at least one DC power source located proximate the DC transmission ring in electrical communication with the DC transmission ring.

7. The electric power transmission system according to claim 1, further including a plurality of diverse distributed generation AC or DC power sources located proximate the DC transmission ring and in electrical communication with the DC transmission ring.

8. The electric power transmission system according to claim 1, further including a plurality of diverse distributed generation DC power sources located proximate the DC transmission ring and in electrical communication with the DC transmission ring, and selected from the group consisting of fuel cells, microturbines, solar photovoltaic devices, batteries, flywheels, superconducting magnets, electrochemical capacitors and DC microgrids.

9. The electric power transmission system according to claim 1, further including a second DC transmission ring interconnected with the system and following a similar but not contiguous route for back-up use.

10. An electric power transmission system, comprising:
    (a) a group of individual utility customers interconnected by a local AC transmission network within a defined geographical area;
    (b) at least one distant electric power generating station for supplying AC power to the local AC transmission network;
    (c) a DC transmission ring having a plurality of DC loads thereon, wherein the DC transmission ring surrounds the local AC transmission network and is interposed between the local AC transmission network and the distant electric power generating station, the DC transmission ring isolating the AC power received from the distant electric power generating station from the local AC transmission network;
    (d) a first plurality of AC/DC converters electrically interfaced between the DC transmission ring and the distant electric power generating station to receive and convert the AC power from the generating station into DC power and making available the DC power converted at a one of the AC/DC converters of the first plurality of AC/DC converters to at least some of the other of the plurality of DC loads on the DC transmission ring;
    (e) a second plurality of AC/DC converters electrically interfaced between the DC transmission ring and the local AC transmission network to receive and convert the DC power from the DC transmission ring into AC power for delivery to the local AC transmission network;
    (f) a plurality of DC/DC converters electrically interfaced with the DC transmission ring to control power flow on the DC transmission ring, the DC/DC converters being adapted to sectionalize the DC transmission ring and isolate faults occurring in the DC transmission ring to prevent the faults from disturbing the system.

11. The electric power transmission system according to claim 10, wherein the AC power generated by the distant electric power generating station is selected from the group consisting of high voltage (HV) or extra high voltage (EHV).

12. The electric power transmission system according to claim 10, and including controlled AC/DC converters for directing power scheduled to flow from the distant electric power generating station to a market distant to the local AC load center across the DC transmission ring.

13. The electric power transmission system according to claim 10, wherein the DC transmission ring is a cable selected from the group consisting of HVDC overhead conductors, underground DC cable, and low voltage DC superconducting cable.

14. The electric power transmission system according to claim 10, and including a plurality of diverse distributed generation DC power sources located proximate the DC transmission ring and in electrical communication with the DC transmission ring, and selected from the group consisting of fuel cells, microturbines, solar photovoltaic devices, batteries, flywheels, superconducting magnets, electrochemical capacitors and DC microgrids.

15. A method of isolating a local AC transmission network having a plurality of AC loads from a surrounding AC system including at least one distant electric power generating station for supplying AC power to the local AC transmission network via an AC or DC transmission line, comprising the steps of:
   (a) substantially surrounding the local AC transmission network with a DC transmission ring having a plurality of DC loads thereon and adapted to receive AC power from the distant electric power generating station;
   (b) isolating the AC power received from the distant electric power generating station by the DC transmission ring from the local AC transmission network;
   (c) converting the AC power from the generating station into DC power and making available the DC power to at least some of the other of the plurality of DC loads on the DC transmission ring;
   (d) interposing at predetermined locations on the DC transmission ring a plurality of isolating DC-DC converters for segmenting and isolating faults on the DC transmission ring to prevent the faults from disturbing the system;
   (e) converting the DC power from the DC transmission ring into AC power; and
   (f) distributing the AC power within the local AC transmission network while all local AC loads therein are isolated from the distant electric power generating station.

16. The method according to claim 15, and including the step of electrically connecting at least one local AC power generator to the local AC transmission network within the DC transmission ring.

17. The method according to claim 15, and including the step of directing power scheduled to flow from the distant electric power generating station to a market distant to the local AC transmission network across the DC transmission ring.

18. The method according to claim 15, and including the step of providing at least one DC power source located proximate the DC transmission ring in electrical communication with the DC transmission ring.

19. The method according to claim 15, and including the step of providing a plurality of diverse distributed generation AC or DC power sources located proximate the DC transmission ring in electrical communication with the DC transmission ring.

20. The method according to claim 15, and including the step of providing a plurality of diverse distributed generation DC power sources located proximate the DC transmission ring, and in electrical communication with the DC transmission ring and selected from the group consisting of fuel cells, microturbines, solar photovoltaic devices, batteries, flywheels, superconducting magnets, electrochemical capacitors and DC microgrids.

21. The method according to claim 15, and including the step of providing a second DC transmission ring interconnected with the system and following a similar but not contiguous route for back-up use.

* * * * *